April 15, 1930.  A. C. THOMAS  1,754,376
GRADING MACHINE
Filed Feb. 23, 1928   3 Sheets-Sheet 1
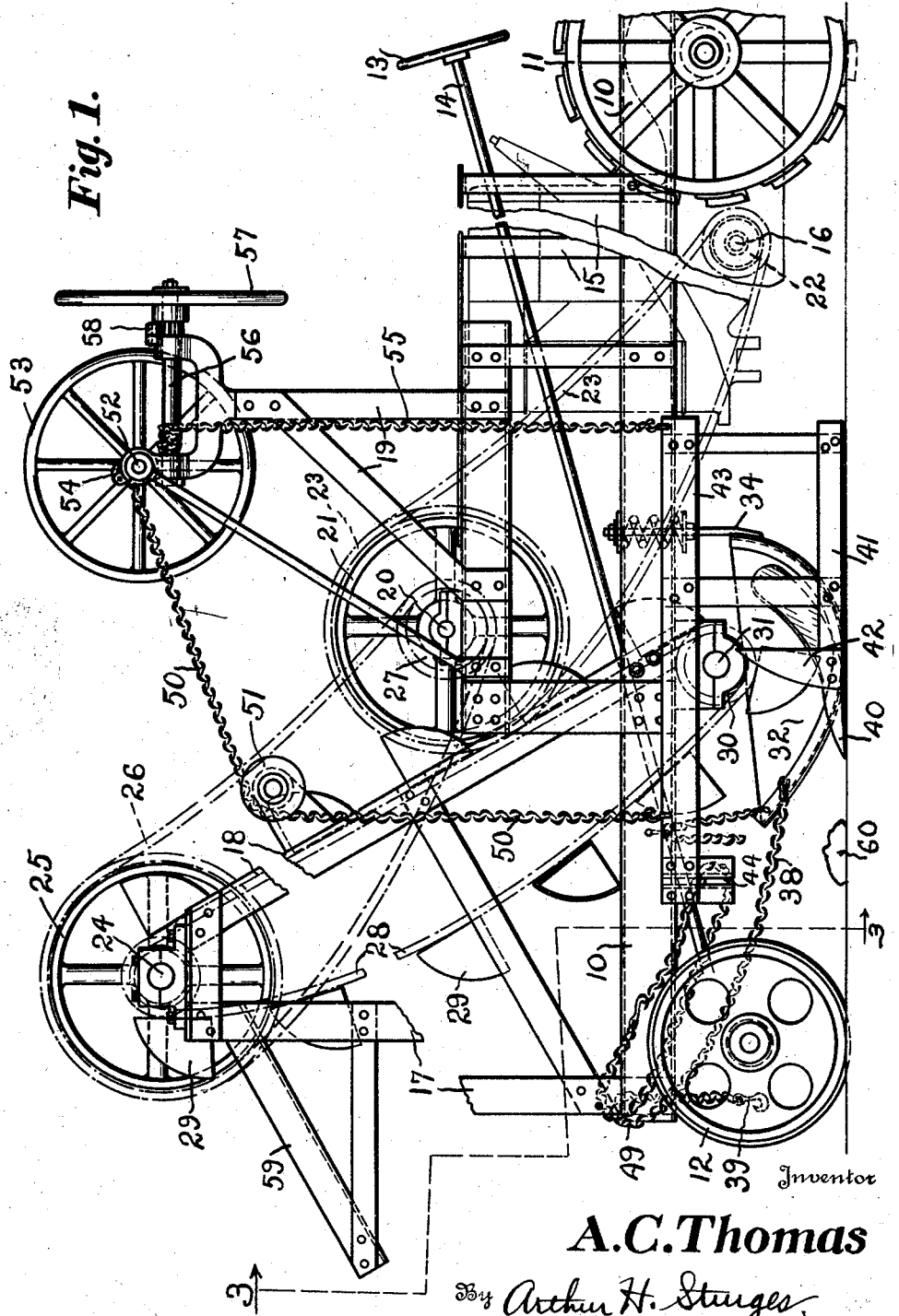
Inventor
A.C. Thomas
By Arthur H. Sturges.
Attorney

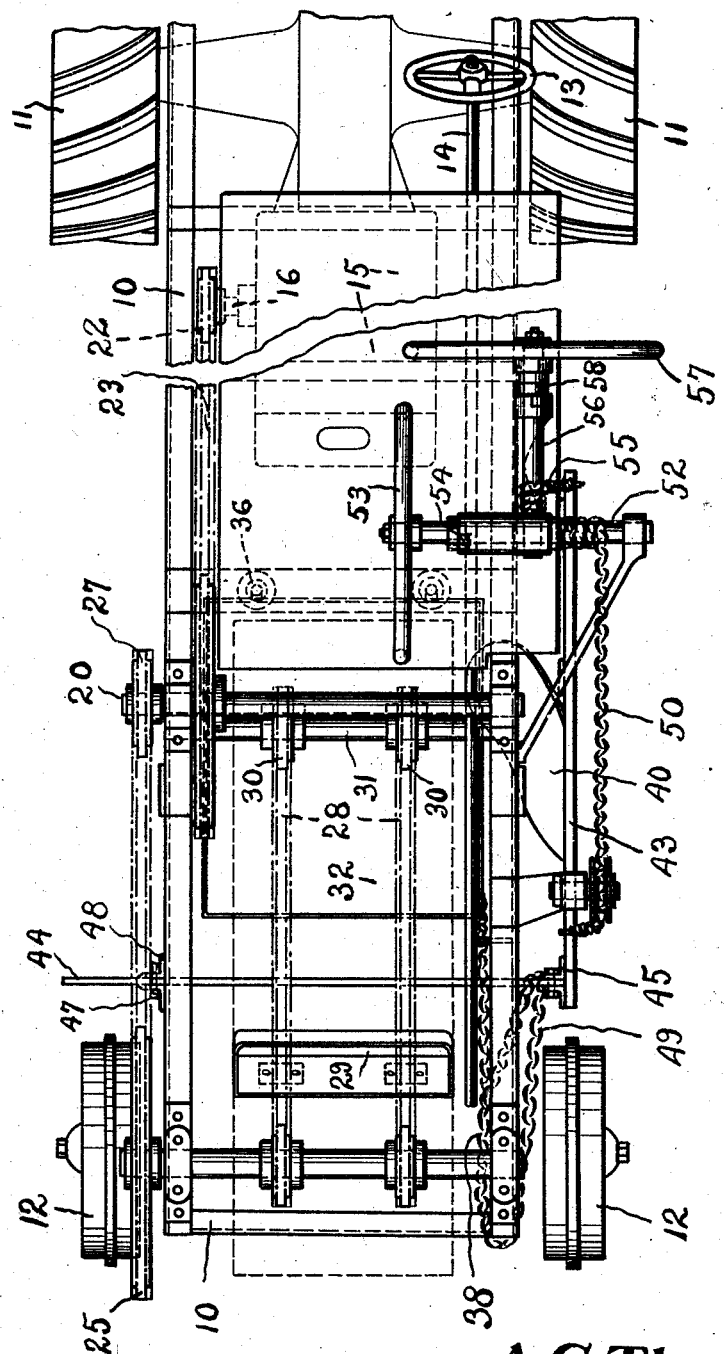

April 15, 1930. A. C. THOMAS 1,754,376
GRADING MACHINE
Filed Feb. 23, 1928 3 Sheets-Sheet 3
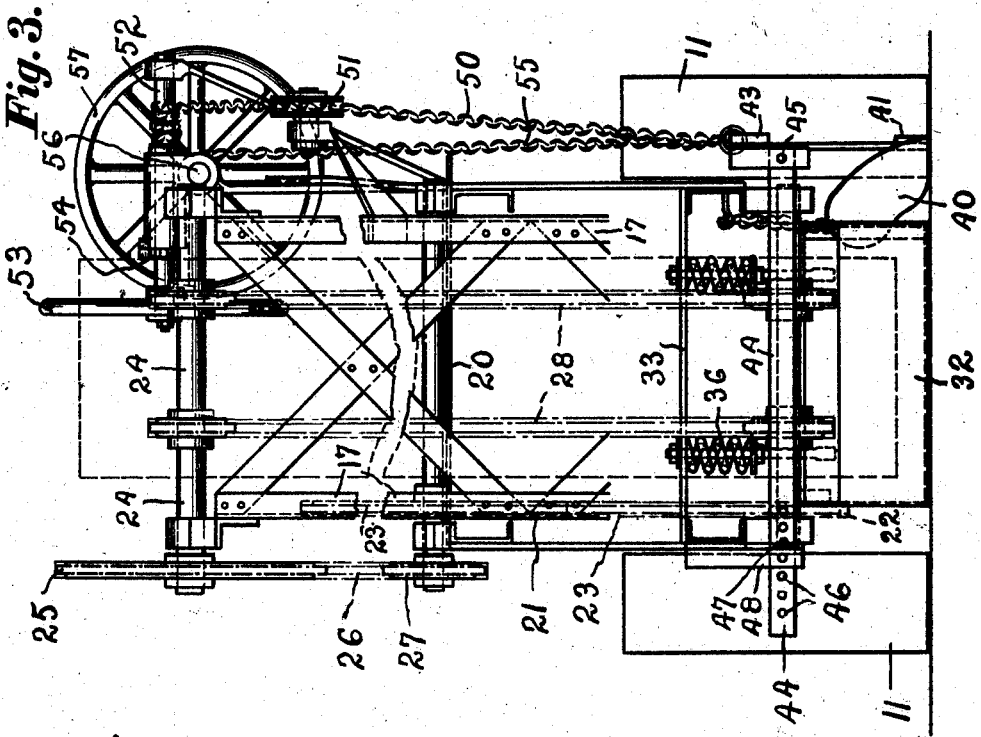
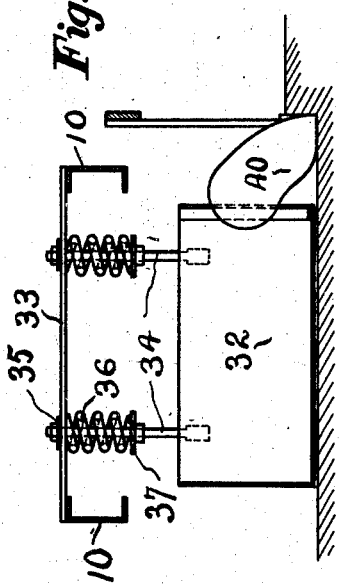
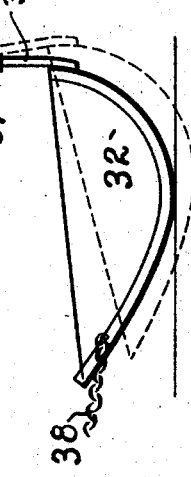
Inventor
A.C.Thomas
By Arthur H. Sturges
Attorney Patented Apr. 15, 1930

1,754,376

UNITED STATES PATENT OFFICE

ARTHUR C. THOMAS, OF OMAHA, NEBRASKA, ASSIGNOR TO LITTLE RED WAGON MFG. CO., OF OMAHA, NEBRASKA, A CORPORATION OF NEBRASKA

GRADING MACHINE

Application filed February 23, 1928. Serial No. 256,266.

The present invention relates to improvements in grading machines of the elevating type, and has particularly reference to the class of machines which are adapted to perform work in a narrow space, such as an alley.

An object of the invention is to provide means for elevating and distributing earth forwardly of the machine and to a selected side of the machine.

Another object is to provide a device operable by one man in which the earth will be turned, elevated and delivered from the machine as the machine progresses along the road.

Other objects of the invention are to improve the earth turning implement and its manner of adjustment, to improve the conveying and earth delivery chute and its arrangement and relative position upon the vehicle; and to provide in conjunction with the elevator an improved trough positioned to receive the earth from the earth turning implement, and said trough having a yieldable and adjustable mounting.

Further objects of the invention are to provide for a grouped adjustment control which will enable the easy and quick adjustment of the plow either laterally or longitudinally.

With the foregoing and other objects in view, the invention will be more fully described hereinafter, and will be more particularly pointed out in the claims appended hereto.

In the drawings, wherein like symbols refer to like or corresponding parts throughout the several views—

Figure 1 is a side view of the machine, parts broken away.

Figure 2 is a top plan view.

Figure 3 is a front elevation, parts broken away, the view being taken along the dotted line 3—3 of Figure 1, and looking in the direction of the arrows.

Figure 4 is a front sectional view of a flexible receiving pan employed, and

Figure 5 is a side view of the same.

Referring now to the drawings for a more particular description, 10 indicates a frame formed preferably of channel-iron. The frame is supported at its rear by means of traction wheels 11 and at its front by means of steering wheels 12, the latter being adapted to have suitable turning movements under the control of the operator by means of a steering wheel 13 and its shaft 14, which connects the steering wheel with the front wheels through a conventional steering arrangement (not shown).

The vehicle is adapted to be propelled by an engine, such as a Fordson tractor, indicated generally at 15. The transmission gear of the engine is provided with a shaft 16 from which the power is derived for operating the latter described parts.

The above described parts are conventional to numerous types of self-propelled vehicles. Upon the forward portion of the frame 10, angle iron supports or masts 17 are provided, they being prevented from vertical swinging movements by means of stays 18. Forwardly of the engine a mounting 19 is provided for various later described members. A transversely disposed shaft 20 is journalled upon the mounting 19 and upon one of its outer ends a sprocket wheel 21 is rigidly secured and adapted to be rotated by means of a small sprocket wheel 22 placed upon the engine shaft 16, communication between the wheels 21 and 22 being provided by means of a sprocket chain 23, which is shown in dotted lines. Upon the top of the mast 17 a transverse shaft 24 is suitably journalled, and upon its outer end a sprocket wheel 25 is secured, adapted to have communication through a chain 26 and be driven by a small sprocket wheel 27, which is also placed upon the shaft 20.

By means of the above described parts it will be noted that the shaft 24 is driven by the engine shaft 16 and that the relative movement of the shaft 24 will be very slow with respect to the shaft 16.

Upon the shaft 24 a pair of endless sprocket chains 28 are provided, which are adapted to elevate a plurality of buckets 29 which are transversely attached to said chains. The lower ends of the chains 28 are in mesh with idler sprocket wheels 30 which are mounted upon a transverse shaft 31, the latter being suitably journaled underneath the frame 10.

By the above described means it will be noted that the engine is adapted to move the buckets 29 while the machine travels forward.

Underneath the frame 10 and preferably between its wheels 11 and 12 a flexibly mounted earth receiving trough 32 is provided within which the buckets 29 are adapted to dip and register. As best shown in Figures 4 and 5, the side rails of the frame 10 are provided with a transverse member 33 to which the trough 32 is flexibly and resiliently attached by means of rods 34. The rods 34 are attached to the trough at its rear upper end, extend through apertures formed in the member 33, downward movement of the rods 34 being prevented by nuts and washers 35. Upward movement of the rods 34 and the trough 32 are cushioned at such times when the force of the spring or springs 36 is overcome, the lower and upper end of the springs having bearings against the bushings 37 and the brace 33 respectively. The forward end of the trough 32 is flexibly maintained in the position shown in Figure 1 by means of a chain 38, which is provided with a hook 39, thereby permitting adjustments of the trough 32 by means of attaching the hook 39 to various positions along the links of its chain 38. Upon the side of the frame 10 an adjustable plow 40 is provided, it being attached to a vertical frame preferably comprising four rectangularly arranged pieces. Upon the forward end of the lower piece 41, an earth cutting knife 42 is mounted. The upper member of the plow-frame is preferably long and is indicated at 43.

The plow and its frame are adapted to have vertical and horizontal adjustments by the following described means.

Upon the front end of the plow frame piece 43 a transverse brace 44 is pivotally attached as at 45 in Figures 2 and 3. The brace 44 is provided with selective apertures 46 at its end opposite to the plow. A bolt 47 is adapted to be selectively inserted through an aperture 46 and bear against a strut 48, Figure 2, in a manner whereby transverse movements of the forward end of the plow will be prevented. A chain 49 is placed about the end of the transverse brace 44 adjacent the forward end of the plow frame, said chain extending over the forward end of the frame 10, Figure 2, it being utilized for preventing the transverse brace from bending rearwardly at its end adjacent the chain.

The plow frame member 43 is adapted to be raised and lowered at either of its ends for adjusting the point of the plow in a manner whereby a selective depth of cut for the plow point may be obtained. A chain 50 is attached to the forward end of the plow frame piece 43 and extends over an idler roller 51, the latter being supported by the member 18. The chain 51 extends over a hand operated winch which comprises a suitably supported and journalled shaft 52, a hand wheel 53 and a ratchet and dog 54. By the foregoing described means the front end of the plow frame may be lowered and raised at will by the operator.

The rear end of the plow frame may be similarly raised and lowered by means of a chain 55, journalled shaft 56, hand wheel 57 and ratchet and dog 58.

The operator who stands or is seated at the rear may operate the various mechanisms as well as steer the vehicle and attend to the engine. As the machine travels forward, the plow turns a furrow of earth into the trough 32 and said earth becomes elevated by means of the buckets 29 to a comparatively high altitude and becomes emptied upon a chute 59 which is located forwardly of the vehicle. A distributing spout, not shown, may be utilized for further distributing the earth from the chute 59 to either side of the vehicle. It will be noted that, as shown in Figure 1, a receiving wagon may be placed directly ahead of the vehicle and the chute 59 solely used for loading the wagon with earth. As thus described, it will be noted that the machine may operate to grade and elevate earth and to receive the same into a receiving wagon, not shown. It will be further noted that the machine may operate for said purpose, in a very narrow space, such as an alley. The ultimate limit of space within which the machine is operable is governed solely by the transverse width of the machine.

It will be noted that, as the machine travels forward, should obstructions such as the stone 60, shown in Figure 1, be encountered by the bottom of the trough, the trough may rise against the force of the spring 36.

It will be understood that since the forward end of the trough is flexibly attached by means of its chain 38 that it will rest upon the ground at practically all times. Two chains 38 may be used.

As shown in Figure 4, the bottom edge of the trough 32 will normally be in alignment with the bottom of the plow's point. The flexible swinging movements of the trough 32 are best illustrated in Figure 5.

I do not wish to be restricted to the size, form, and proportions of the various parts, and obviously changes could be made in the construction herein described without departing from the spirit of the invention, it being only necessary that such changes fall within the scope of the following claims.

What is claimed is:—

1. In a grading machine, a tractor having a power shaft and a forward extension frame, braced masts on the forward portion of the frame, an endless elevator mounted between said masts and having buckets thereon, driving connections from said power shaft to the conveyor, a delivery chute from the conveyor mounted on the masts and extending forwardly and downwardly therefrom, a trough carried beneath the tractor, an earth turning implement located beside the trough, an adjustable frame for the earth turning implement, and means for adjusting said frame.

2. In a grading machine, a tractor having a power shaft and a frame, masts rising from the forward end of the frame, an endless elevator mounted upon said masts and having buckets thereon, a power connection between said power shaft and the conveyor, a delivery chute mounted on the masts adjacent the conveyor and extending forwardly and downwardly therefrom, a trough carried beneath the tractor, an earth turning implement mounted on the tractor adjacent the trough, and means for adjusting said earth turning implement.

3. In a grading machine, a tractor having a frame and a power shaft mounted therein, a pair of masts rising upwardly from the forward end of the frame, an endless elevator mounted between said masts and having a plurality of buckets thereon, driving means for the conveyor connected to said power shaft, a delivery chute mounted on said masts adjacent the conveyor and extending forwardly and downwardly relatively to the frame, a trough mounted beneath the tractor, an earth turning implement arranged beneath the tractor and at one side of said trough, an adjustable frame mounted on said first frame and connected to said earth working implement, and means for adjusting said second frame.

In testimony whereof, I have affixed my signature.

ARTHUR C. THOMAS.